United States Patent [19]

Christen et al.

[11] Patent Number: 4,728,922
[45] Date of Patent: Mar. 1, 1988

[54] VEHICLE MONITORING SYSTEM

[76] Inventors: Chris R. Christen, 64 Summitcrest Drive, Weston, Ontario, Canada, M9P 1H5; Frank M. Cianfarani, 2757 Battleford Drive, Apt. 15-32, Mississauga, Ontario, Canada, L5N 3A8

[21] Appl. No.: 792,601

[22] Filed: Oct. 29, 1985

[30] Foreign Application Priority Data

Mar. 21, 1985 [CA] Canada ................................ 477195

[51] Int. Cl.⁴ ........................ B60Q 1/00; G01G 19/08
[52] U.S. Cl. .................................. 340/52 R; 177/136; 340/666
[58] Field of Search ...................... 340/52 R, 665, 666, 340/991, 69; 180/290, 286; 177/136–139, DIG. 5; 73/DIG. 3; 455/99; 364/567

[56] References Cited

U.S. PATENT DOCUMENTS

| | | | |
|---|---|---|---|
| 2,792,209 | 5/1957 | Allen | 177/137 |
| 2,864,943 | 12/1958 | Schultz | 250/15 |
| 3,172,492 | 3/1965 | Sobotka et al. | 177/136 |
| 3,455,410 | 4/1967 | Wilson | 180/286 |
| 3,634,635 | 1/1972 | Ellis | 340/52 R |
| 4,036,317 | 7/1977 | Hellkvist | 177/137 |
| 4,076,093 | 2/1978 | Mizuno | 340/69 |
| 4,083,003 | 4/1978 | Haemmig | 340/991 |
| 4,241,337 | 12/1980 | Prada | 340/547 |
| 4,251,801 | 2/1981 | Le Mair et al. | |
| 4,303,904 | 12/1981 | Chasek | |
| 4,306,219 | 12/1981 | Main et al. | |
| 4,328,494 | 5/1982 | Goodall | 177/136 |
| 4,354,252 | 10/1982 | Lamb et al. | |
| 4,366,481 | 12/1982 | Main et al. | |
| 4,375,839 | 3/1983 | Manning et al. | 340/666 |
| 4,392,125 | 7/1983 | Iwata | |
| 4,398,172 | 8/1983 | Carroll et al. | |
| 4,399,437 | 8/1983 | Falck et al. | |
| 4,539,650 | 9/1985 | Griffin et al. | 177/136 X |
| 4,591,823 | 5/1986 | Horvat | 340/52 R |

FOREIGN PATENT DOCUMENTS

| | | | |
|---|---|---|---|
| 1043450 | 11/1978 | Canada | |
| 1152601 | 8/1983 | Canada | |
| 1153441 | 9/1983 | Canada | |
| 2471593 | 12/1979 | France | 177/136 |
| 1272762 | 5/1972 | United Kingdom | 177/137 |
| 2094585 | 9/1982 | United Kingdom | 340/666 |

OTHER PUBLICATIONS

Outwit Car Thieves? by Stuart F. Brown published in Popular Science, Jan. 1985, pp. 63–65.

Primary Examiner—James L. Rowland
Assistant Examiner—Brian R. Tumm
Attorney, Agent, or Firm—Wegner & Bretschneider

[57] ABSTRACT

A vehicle monitoring system for installation in a vehicle includes a receiver for receiving a radio transmission from a transmitter located in the vicinity of the vehicle at a central processing unit connected to the receiver and adapted to process and store information from the receiver. A device is provided for visually displaying information stored in or received by this central processing unit. Sensors are mounted in the vehicle for determining or measuring physical parameters including the weight of the vehicle and converting the sensed or measured parameters to electrical signals indicative thereof, which are then conveyed to the central processing unit. The monitoring unit is provided with a power supply unit including at least one battery. The weight sensors can comprise Hall effect/magnetic sensors mounted on axle assemblies of the vehicle, which are capable of producing a suitable signal indicative of the weight. A transmitter is also provided for sending information concerning the vehicle by radio transmission to a vehicle monitoring station. The weight sensors can be adapted to sense the weight while the vehicle is moving; the processing unit then receives and stores a number of weight readings over a short time interval and applies an algorithm to these readings to determine the weight of the vehicle.

17 Claims, 17 Drawing Figures

VEHICLE MONITORING SYSTEM

BACKGROUND TO THE INVENTION

This invention relates to vehicle monitoring systems and in particular a system capable of monitoring the weight of a vehicle, such as a transport truck, and displaying or indicating this weight to either the driver of the truck or to a remote monitoring station.

At the present time, the only method known to the applicants for monitoring truck traffic along public highways is the use of publicly operated inspection stations provided with weigh scales and located at strategic locations along the highway. A number of problems have been encountered however with the operation of the present stations, perhaps the major one being that in peak traffic periods they are unable to handle the large volumes of commercial vehicles without lengthy delays. The delays are caused apparently by the length of time it requires to weigh these large commercial vehicles which can be quite long and the time required to manually log details concerning the vehicle such as its license class, manifest and violations committed. The problem might be overcome by providing greater facilities at these vehicle stations or by increasing the manpower but this could only be done at a considerable increase in costs to the public or to highway users, and governments are under increasing pressure to keep unnecessary costs down as much as possible.

Another problem with the present vehicle monitoring system is that because of manpower or labour union requirements, the present inspection stations are only open during certain hours of the day and therefore they are unable to monitor vehicles during off hours such as during the night. If a system could be found to automatically and quickly check and process commercial vehicles, it might be possible to have such inspection stations operate 24 hours a day either with no manpower at all or with very minimal staff.

A further problem with the present operation of highway inspection stations is that in order to catch violators or trucks that exceed their maximum allowed weight, it is generally necessary for the authorities to impose a rule that all commercial vehicles turn off the highway and into the inspection station facilities so that each vehicle can be checked. This is true even though many of the vehicles might have already gone through an inspection station at some other location earlier during the same trip. It will be appreciated that for a truck to have to stop at several such stations during the course of a single trip may result in the trip requiring considerably more time and fuel than would otherwise be the case. These extra costs must eventually be passed on to those hiring or using the commercial vehicles.

Vehicle monitoring systems of various sorts are known at the present time but as far as applicants are aware such systems have not been developed for use by commercial transport vehicles in order to overcome the aforementioned problems that the owners of these vehicles face. For example U.S. Pat. No. 4,251,801 issued Feb. 17, 1981 to U.S. Philips Corporation describes a communication system in which a fixed station consecutively interrogates a fleet of vehicles by the sending and receiving of messages. A receiver of the fixed station effects for each vehicle in turn synchronism with the reply messages transmitted by the relevant vehicles. The system appears to be designed for a fleet of vehicles such as buses. The use of coded messages for transmission over the airwaves is also disclosed.

Recent U.S. Pat. No. 4,303,904 issued Dec. 1, 1981 to Norman E. Chasek describes a system for facilitating the collection of tolls from the operators of motor vehicles. In order for the system to operate, the amount of money that is paid for toll purposes is recorded in the machine. As the vehicle passes the toll collection point, a toll transponder receives billing information from the vehicle transponder, calculates the toll payable, transmits this information back to the vehicle transponder where the toll is electronically subtracted from a stored balance. If the resulting balance is not negative, a pass signal is passed. This known system also employs three different codes in the vehicle's permanent memory.

U.S. Pat. No. 4,398,172 issued Aug. 9, 1983 to Eaton Corporation teaches a monitoring system designed for rental cars. A unit mounted in each vehicle includes circuitry for transmitting, on a continuous repetitive basis, information characterising the vehicle and unique thereto. A monitoring unit mountable at the monitoring location includes circuitry for receiving information transmitted by the vehicle unit. The unit in the vehicle can transmit information as to the mileage of the vehicle and as to fuel tank level, which information is required before the driver can leave the vehicle with the company.

An object of the present invention is to provide a vehicle monitoring unit for installation in a vehicle, such as a transport truck, whereby government transport authorities can quickly and easily monitor truck traffic in their territory.

A further object of the invention is to provide a vehicle monitoring unit for installation in a vehicle that includes means for sensing physical parameters of the vehicle including the weight thereof.

SUMMARY OF THE INVENTION

According to the present invention, a vehicle monitoring unit for installation in a vehicle includes means for receiving a radio transmission from a transmitter located in the vicinity of the vehicle and a central processing unit connected to the receiving means and adapted to receive and process information sent from the receiving means. There are also provided means for visually displaying information stored in or received by the central processing unit and means for sensing or measuring physical parameters of the vehicle, including the weight thereof and converting the sensed or measured parameters to electrical signals indicative thereof. There are means for conveying these electrical signals to the processing unit for storage or processing and further means transmit information concerning the vehicle by radio transmission from the processing unit to a vehicle monitoring station in the vicinity of the vehicle. A power supply provides the necessary electrical power to the monitoring unit.

In one preferred embodiment the sensing or measuring means comprise Hall effect/magnetic sensors mounted on axle and spring assemblies of the vehicle and adapted to measure relative movement between the undercarriage or body of the vehicle and the axle and spring assembles and to produce a suitable signal that is indicative of the weight of the vehicle.

According to another aspect of the invention, a vehicle condition monitoring system comprises means for sensing or measuring physical parameters of a vehicle including the weight thereof and converting the sensed or measured parameters to electrical signals indicative thereof. The sensing or measuring means are adapted for mounting on the vehicle. There is also a central processing unit adapted to receive, process and store information received from the sensing or measuring means and adapted to be mounted in the vehicle. Further means convey the electrical signals to the processing unit from the sensing or measuring means. There is also means for visually displaying information stored in or received by the central processing unit to an operator of the vehicle. A power supply provides the necessary electrical power for the monitoring system.

According to a further aspect of the invention, a vehicle condition monitoring unit for installation in a vehicle comprises means for receiving a radio transmission from a transmitter located in the vicinity of the vehicle, a central processing unit operatively connected to said receiving means and adapted for mounting in said vehicle and for processing and storing information sent to the processing unit by said receiving means, power supply means for said monitoring unit, means for sensing or measuring physical parameters of said vehicle and converting the sensed or measured parameters to electrical signals indicative thereof, means for conveying said electrical signals to said processing unit for storage or processing, means for transmitting information concerning said vehicle by radio wave transmission form said processing unit to a vehicle monitoring station in the vicinity of said vehicle, and means for alerting an operation of said vehicle that he should stop the vehicle at said vehicle monitoring station, said altering means operating in response to a radio transmission from said vehicle monitoring station received by said receiving means.

In one preferred embodiment the alerting means comprises means for producing an audio sound that can be heard by the operator of the vehicle.

Further features and advantages will become apparent from the following detailed description taken in conjunction with the accompanying drawings.

DETAILED DESCRIPTION OF PREFERRED EMBODIMENTS

Figure 1:
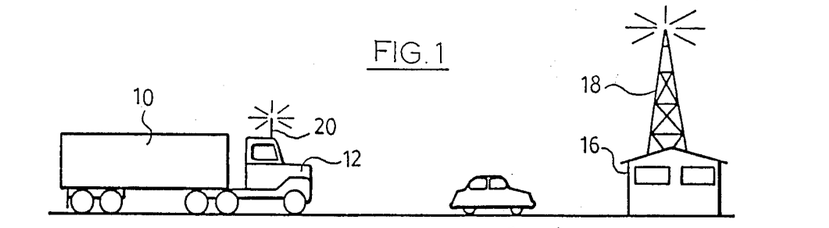
FIG. 1 is a schematic illustration of a transport truck equipped with the system of the present invention approaching a vehicle monitoring station on a highway.

The schematic illustration of FIG. 1 illustrates how one embodiment of a vehicle monitoring unit or unit interrogation system can be used. In this embodiment a commercial vehicle comprising a truck 10 is fitted with the vehicle monitoring unit in the tractor portion 12 and in particular the cab 14 illustrated in FIG. 2. The vehicle 10 is approaching a vehicle monitoring station 16 which would in the majority of cases be operated by the department of transport having jurisdiction in the area. Such stations are located at strategic points along highways and they are generally equipped with one or more weigh scales capable of measuring the weight of large commercial vehicles. These stations provide a means for the government responsible for the highways to check that trucks and other commercial vehicles are complying with all statutes and regulations governing their use including maximum weight limits, licensing requirements and rules regarding the types of cargos that can be carried. In the embodiment shown the station 16 is equipped with a radio transmitter and a radio transmission tower 18. The tower 18 need not be large if it is being used only for the present interrogation system since the vehicles to which transmissions are being sent would normally be within a few miles of the transmission tower. In order to be better able to receive the transmission the truck tractor 12 can be equipped with a suitable radio antenna 20. It will also be understood that in the operation of present weigh scale stations, it is normally necessary for all commercial vehicles and trucks to turn off of the highway and to pass through the checking facilities of the station. There is no other satisfactory way at present by which the authorities can satisfy themselves that all of the vehicles passing the station are complying with government or industry requirements. However use of the present vehicle monitoring unit by a truck or other commercial vehicle will often avoid the need for the vehicle to stop at such stations. This is particularly true in the case where the truck has already entered one weigh scale station and has been checked and approved by the authorities at this station. With the use of the present system, stops at further weigh scale stations located along highways travelled by the vehicle on the same trip are unnecessary. It is contemplated that with the use of the present invention, the weigh scale stations of one jurisdiction would all be linked to and have access to a central computer in which information concerning vehicles would be stored.

Figure 2:
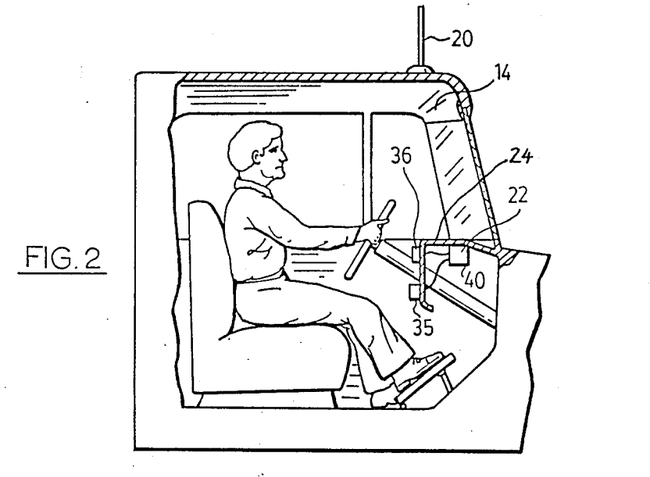
FIG. 2 is a sectional schematic elevation showing the interior of the cab of a truck and the location of a monitoring unit constructed in accordance with the invention attached to the dash.
Figure 3:
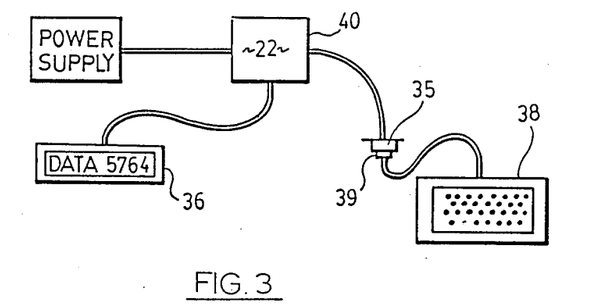
FIG. 3 is a schematic illustration of the components of the monitoring unit.
Figure 14:
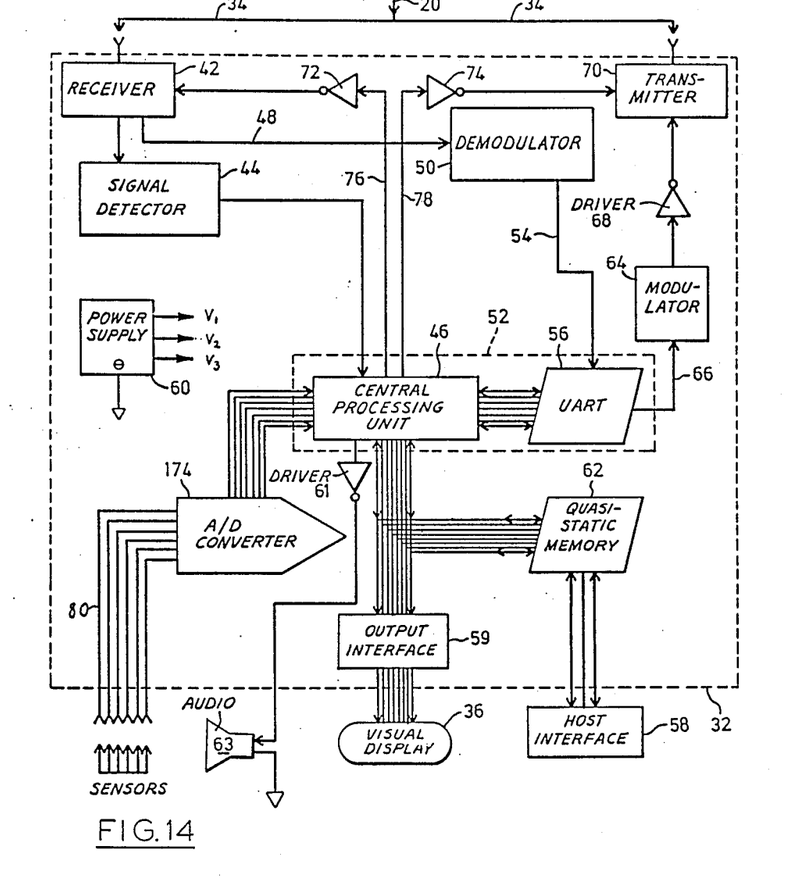
FIG. 14 is a block diagram illustrating the layout and connections for a preferred vehicle monitoring unit.

The main component of the vehicle monitoring unit in the truck is indicated at 22 in FIG. 2. The unit 22 can be mounted under the dash 24 of the truck if desired. It will be appreciated that it could also be mounted on top of the dash or in some other location where it will not interfere with the normal operation of the truck. The electrical components in the preferred vehicle monitoring unit 22 are illustrated in FIG. 14 from which it will be seen that the unit 22, which can comprise the components within a rectangle 32 formed by the dashed line, is connected to the antenna 20 by a suitable cable 34. The unit 22 can be made quite compact, measuring as small as 3 inches×5 inches by 1.5 inches. The unit preferably is connected to a means for visually displaying information stored in or received by the unit. In the embodiment shown in FIG. 3, the unit has a visual display device 36 that is mounted on the dash so that it can be seen clearly by the operator of the vehicle. The device 36 can be of the liquid crystal or L.E.D. type. Alternatively the unit could be provided with a printer and a supply of paper so that stored or received information can be typed automatically by the unit. Preferably the unit also has an electrical socket 35 shown schematically in FIG. 3 and connected to the dash as shown in FIG. 2. This socket permits an optional keyboard 38 to be connected by means of plug 39 to the unit 22. This keyboard can be used by the operator of the vehicle to either feed information into the unit or to provide the unit with necessary instructions. For example the operator of the vehicle might wish to instruct the unit to display on the device 36 the current weight of the vehicle or the load distribution. The keyboard could take the form of a connectible electronic typewriter keyboard with necessary modifications to permit it to be used to feed information to the central processing unit that forms a major component of the unit 22. Keyboards of this type are well known in the computer art and need not be described further herein.

The main components of the vehicle monitoring unit designed for installation in a vehicle are mounted in their own housing or casing 40. This enables the unit to be installed in a variety of vehicles with a minimum of difficulty. However it will be appreciated that the various components of the unit illustrated in FIG. 14 can be installed separately, perhaps in or under the dash of the vehicle, if desired. In some embodiments only some of the principal components could be mounted outside the main housing 40 (for example a suitable power supply for the unit).

The vehicle monitoring unit has means for receiving a radio transmission from a transmitter located in the vicinity of the vehicle 10. As already indicated, such a transmitter would in many cases be located at a weigh scale station 16 located along the highway. Alternatively it could be installed in a mobile station such as a truck operated by the transport authorities. The receiver 42 is tailored to be compatible with the user's and the transmitter's specifications. The preferred mode of transmission would either be VHF/FM or UHF/FM. The receiver would include the usual preamplifier. The receiving signal would also have a filter to remove noise from the received signal. In addition to having means for removing the local modulator signal, the receiver would have a second phase detector 44 set at a specified frequency for producing a carrier detect signal which is sent to a central processing unit 46 in order to indicate that an interrogation signal is active. The receipt of such a signal by the central processing unit is necessary in order for the central processing unit to transmit information being requested by the vehicle monitoring station. The unit is programmed to send such information over the air only when the required interrogation signal is being received. The receiving means can also have a limiter stage which provides a TTL (transistor-transistor logic) or a CMOS (complimentary metal-oxide silicon type integrated circuit) compatible signal level. The signal processing, carrier detect, and limiter-filter operations can be carried out by a single known unit sold under model number XR2103 by Exar Integrated Systems, Inc. of 750 Palomar Ave., Sunnyvale, Calif. 94086. As the use and construction of such a unit is known in the art, further detailed description of this component is deemed unnecessary for purposes of the present invention.

The receiver 42 is also connected by a line 48 to a demodulator 50. The demodulator portion of the unit, which portion can also include a suitable buffer, converts the frequency- or phase-shifted keyed encoded carrier signal sent from the receiver into serial data usable by the central processing unit 46. The demodulator 50 is connected to the central processing unit via UART which can be built into the central processing unit as indicated by the dashed line 52. A signal transmission line 54 connects the demodulator to the UART 56. In one embodiment the signal demodulator is provided by one half of a known signal demodulator bearing model number XR14412 sold by the aforementioned Exar Integrated Systems, Inc. of Sunnyvale, Calif. The other half of this known unit is used for signal modulation as indicated hereinafter.

The central processing unit 46 preferably comprises a microcomputer capable of directing all of the functions of the vehicle monitoring unit in accordance with a firmware programme in an EPROM that is a principal component therein. The EPROM (erasable programmable memory) as is well known can be returned to its unprogrammed state if required by exposing the integrated circuit therein to ultraviolet light through a window provided in the device. The microcomputer can comprise that sold by Zilog, Inc. of 10340 Bubb Rd., Cupertino, Calif. 95014 under model number Z8603 but other microcomputers could also be used. The aforementioned Zilog microcomputer includes such features as one full duplex UART (universal asynchronous receiver/transmitter), one RS-232C port, 2 parallel ports (one of which can be used as an input and the other of which can be used as either an input or an output), one external I/O bus (8 byte) and one "piggyback" 32K EPROM. As microcomputers of this type are well known and the detailed construction of the microcomputer itself does not form part of the present invention, further description of the microcomputer is deemed unnecessary. The microcomputer can perform data acquisition function, either by means of the aforementioned receiver 42 or by means of sensors to be described, and display output function such as by means of the aforementioned screen 36. To provide an output to the operator of the vehicle, the processing unit 46 is connected to an output interface/driver 59 which allows a standard alpha-numerical, C.R.T. or other visual display 36 to be utilized. Examples of interface drivers that can be used are those sold by Intersil Inc. of Cupertino, Calif. under Model No. ICM7733 (for alpha numerical display) or Model No. ICM7218 (for 7 segment display). If desired it can also interface with a host computer as indicated at 58 in FIG. 14. The microcomputer is also capable of detecting tampering and attempts at defeating the integrity of its information and of alerting the users of the system to such. The microcomputer is capable of doing this by detecting any break in the signals (even for a microsecond) from any of the sensors feeding essential information to it and also by detecting any break in the power supply or a high voltage condition such as a deliberate or unintentional burnout. If a break or condition of this nature is detected by the microcomputer, it is programmed to generate a default condition signal which is sent over the transmitter (to be described).

It will be understood that the microcomputer 46 can be interrogated by a master system such as the one located at the aforementioned weigh scale station 16 operated by the highway authorities. However interrogation can only take place if the necessary interrogation signal is sent by the transmitter at station 16. As indicated already whether or not the proper interrogation signal is being received is detected by the signal detector 44 which, upon receipt of this signal, will permit the microcomputer (after receipt of appropriate instructions) to transmit the compiled data therein to the monitoring station operated by the authorities for their information and possible use if this information is specifically requested. The microcomputer is capable of receiving instructions or updated information from the master system by way of the receiver 42. The updated information can be stored in the memory of the computer. In any event if the vehicle meets all legal requirements, either by way of the transmissions sent by it to the station 16 or by actually stopping at the station 16, the fact that the vehicle has been checked and approved by the station will normally be recorded in the memory of the computer by a suitable transmission from the vehicle monitoring station. It will also be stored in the large central computer operated by the transport authorities. In this way provided a change in the essential conditions of the vehicle is not detected or sensed, stops at any further monitoring stations encountered by the vehicle on its trip should be unnecessary. This will result in substantial savings of time and fuel, particularly for vehicles on long journeys.

A regulated power supply 60 is provided for the vehicle monitoring unit 22. It provides a constant electrical source for the various devices and components that make up the unit and in one preferred embodiment would provide a selection of necessary voltages as indicated in FIG. 14. A suitable solid state regulated power supply is that sold by National Semiconductor Corporation of 2900 Semiconductor Dr., Santa Clara, Calif., 95051 under model numbers LM7900 and LM7800. The operation and construction of such power supplies are well known and as the actual construction of the power supply itself does not form part of the present invention further description of this component is deemed unnecessary. The power supply would receive its main source of power from the truck battery or batteries but it would also have a small independent source of power, such as a nickel-cadmium battery installed in the power supply unit itself, that would provide necessary power to the microcomputer in the event of an interruption of supply from the truck battery. The emergency power supply would be sufficient to keep the memory of the microcomputer in operation so that information and possibly programmes stored therein would not be wiped out.

If the owner or operator wishes an audio output from the processing unit 46 in addition to a visual display, an audio power amplifier 61 can be connected to the processing unit. This amplifier provides a medium power output from the low level C.P.U. output. Known amplifiers that can be used for this purpose are Model No. LM 383 sold by National Semiconductor Corp. or Model No. 1 CH8510 sold by Intersil Inc. The amplifier 61 can operate a speaker indicated at 63 located in the cab of the vehicle or a suitable buzzer or other alarm. The buzzer or speaker could indicate that the vehicle is overweight or that a monitoring station is requesting that the vehicle turn in to it for either inspection or weighing.

A quasi-static memory 62 is optional and, if provided, is a convenient and effective method of adding additional static memory for complex programmes that may be required. A suitable component to provide such a memory is that sold by the aforementioned Zilog, Inc. under model number Z6132. A quasi-static memory is similar to firmware memory except that it can be changed electrically. It also has the advantage that information or programmes stored therein will not be lost if there is an interruption in power to the unit.

Turning now to the means for transmitting information concerning the vehicle 10 by radio transmission from the processing unit 46 to a vehicle monitoring station such as the station 16 illustrated in FIG. 1, the transmitting means includes a modulator component 64. In the illustrated embodiment the unit 64 is connected by cable 66 to the UART of the microcomputer. The unit 64 is capable of keying the output data from the microcomputer 46 by frequency shift modulation or phase shift modulation. The unit 64 preferably also includes a suitable buffer and a band limit filter, the latter device ensuring that the signal output to a transmitter 70 is within the frequency spectrum required. The unit 64 can further include, if desired, a high security ciphering processor for encrypting the output data from the microcomputer before it is transmitted. The purpose and operation of the ciphering devices is further described hereinafter. As mentioned earlier signal modulation can be provided by one half of the component used for the demodulator 50. Such a component can be that sold by the aforementioned Exar Integrated Systems, Inc. under model number XR14412. The optional data ciphering processor which can be used with this component can be type AMZB068 sold by Advanced Micro Devices, Inc. of 901 Thompson Pl., P.O. Box 3453, Sunnyvale, Calif., 94088. This ciphering processor operates by converting the parallel data received from the microcomputer in the form of binary bytes to an altered state which can only be deciphered into readable information if the receiver is equipped with the necessary decoding device. The aforementioned ciphering processor sold by Advanced Micro Device comprises a single integrated circuit chip that is capable of either ciphering or deciphering data. The particular function that is carried out by the chip depends upon how the chip is connected into the transmitting or receiving circuit. The ciphering processor is designed to encrypt and decrypt data according to the National Bureau of Standards Data Encryption Standard (DES), as specified in Federal Information Processing Standards Publication 46. The DES specifies a method for encrypting 64-bit blocks of clear data into corresponding 64-bit blocks of "cipher text".

Connected to the output of the modulator component 64 is a driver or linear amplifier 68. The amplifier 68 monitors and maintains an appropriate data signal level to the transmitter 70. In one preferred embodiment the amplifier 68 comprises a unit sold under model number LM741C by National Semiconductor Corporation of Santa Clara, Calif.

The transmitter 70 itself can comprise any suitable transmitter capable of transmitting by means of VHF/FM or UHF/FM to a vehicle monitoring station in the vicinity of the vehicle 10. It should be configured to meet the baud-rate transmission requirements, the regulations of the local authorities (such as the department of transport or the department of highways), proximity requirements and any parameters that the user or operator requires. In one embodiment it is capable of slewed operation in the VHF and UHF band by frequency modulation.

In addition to the aforementioned components of the unit 22 there are also two switches 72 and 74 for turning the receiver and transmitter on or off as required. These switches are preferably analog solid state switches that permit the receiver 42 and the transmitter 70 to operate as per programme priority instructions. In the preferred embodiment the switches will operate the receiver and the transmitter simultaneously if this state of operation is required. A preferred form of switch for either the switch 72 or the switch 74 is the analog switch sold under model number CD4066 by National Semiconductor Corporation of Santa Clara, Calif. It will be noted that the switches are operated by the processing unit 46 through lines 76 and 78. The instructions sent by the processing unit to the switches depend upon the particular stage that the vehicle monitoring unit is in at the time. For example if the unit is in the process of listening for or receiving an interrogating signal, then the receiver 42 has priority and only switch 72 is in the on condition. The processing unit 46 would send a signal to the switch 74 that would either bring the switch to the closed condition or maintain it in a closed condition. If a proper interrogating signal has been received and the monitoring unit has been instructed to send data to the vehicle monitoring station operated by the authorities, the processing unit 46 would instruct the switch 72 to go to the "off" state and would instruct the switch 74 to go to the "on" state so that the transmitter can operate. If the microcomputer is recalibrating a sensor of other component by means of data received through the receiver 42, then the processing unit would instruct switches 72 and 74 to operate both the receiver and the transmitter at the same time, that is the receiver and the transmitter would have equal priority since both are generally necessary for recalibration to take place. In a preferred embodiment of the vehicle monitoring unit the receiving and transmitting frequencies would differ slightly in order that they would not interfere with each other if the unit is both receiving and transmitting at the same time.

Figure 4:
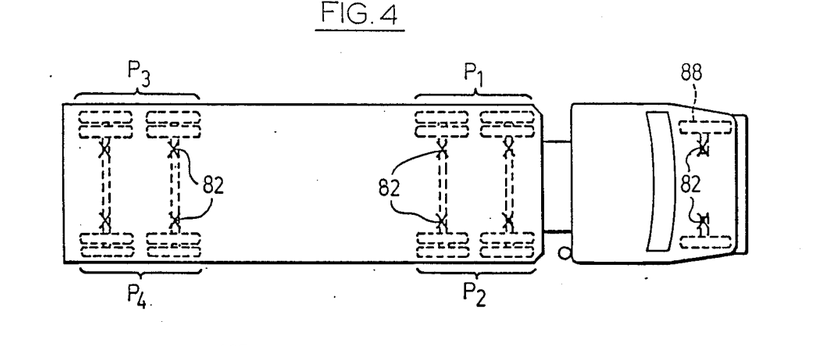
FIG. 4 is a schematic plan view of a transport truck showing the locations of a number of sensors for determining the weight of the vehicle.
Figure 5:
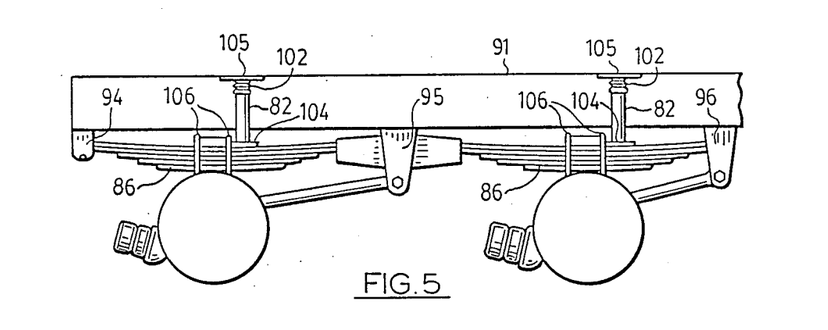
FIG. 5 is a side view of typical tandem axle and spring assemblies for a transport truck, which assemblies have weight sensing devices connected thereto.
Figure 6:
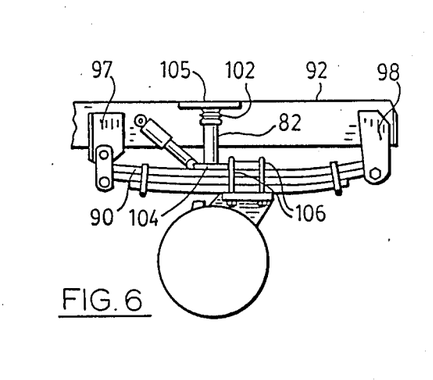
FIG. 6 is a side view of a single axle and spring assembly with a weight sensing device mounted thereon.
Figure 7:
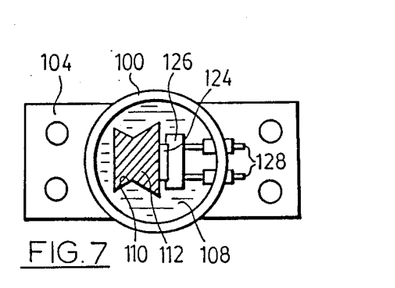
FIG. 7 is a top view showing a ferrous case for a Hall effect/magnetic sensor and the connecting lugs therefor.
Figure 8:
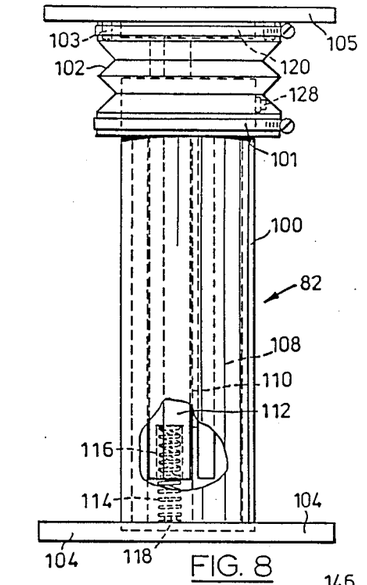
FIG. 8 is a side view of a Hall effect/magnetic sensor.
Figure 9:
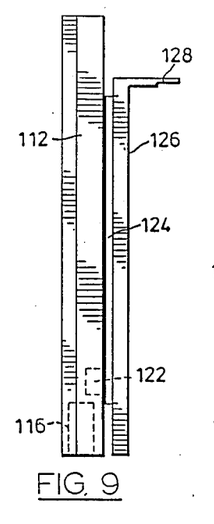
FIG. 9 is a side view showing the position transducer and an elongate Hall sensing device for the sensor of FIG. 8.

In addition to having the capability of storing information that has been fed into the microcomputer 46 either by means of the keyboard 38 or by radio transmission picked up by receiver 42, the microcomputer can store important and necessary information fed to it through cables or wires 80 from various sensors located at various locations on the vehicle or truck 10. These sensors provide means for sensing or measuring physical parameters of the vehicle, including the weight thereof and converting the sensed, or measured parameters to electrical signals indicative thereof. In the case of weight sensors for a transport truck, FIG. 4 provides an illustration of the locations of the weight sensors 82 that can be used. The precise location of the weight sensor and the number required will depend upon the type of axle and spring assemblies used in the truck. FIG. 4 illustrates a typical truck and trailer combination having a total of five axles. The tandem axles at the back of the trailer and at the back of the tractor can be of the type shown in FIG. 5 wherein each axle is supported by its own leaf springs 86. The single front axle on the front of the tractor can be arranged in the manner shown in FIG. 6 and is provided with means for steering the front wheels 88. The means for mounting the front wheels is shown in FIG. 6 wherein a set of leaf springs 90 resiliently connect the front axle to the frame 92 of the tractor. Although typical forms of axle supports are schematically shown in FIGS. 5 and 6, it will be understood that various other means can be and are used to support the body of a truck or commercial vehicle on its axles and the present invention is by no means limited to the type of axle and spring assemblies shown in these figures. It will be further understood that the leaf spring assemblies shown are connected directly or indirectly at their opposite ends to the adjoining frame of the vehicle by means of connecting brackets 94 to 98. The centre portion of the spring assemblies on the other hand are free to move upwardly or downwardly relative to the adjoining vehicle frame 91 or 92. The location of the centre portion of each leaf spring assembly relative to the adjoining frame will depend primarily on two factors, namely the total weight of the vehicle and its load being supported by the respective axle and the momentary road conditions being encountered as the vehicle travels along the highway. The first factor will remain relatively stable as the vehicle travels along the highway because its weight should not change. The second factor will or may change constantly, depending upon the road conditions but the effects of bumps or potholes on the position of the centre portion of the spring assembly will tend to be brief and insignificant from the standpoint of weight determination. The effect of road conditions on the momentary position of the axle and spring assembly relative to the adjacent frame can be eliminated by arranging the program to take a weight reading from the sensors only when the vehicle is stopped or parked as this is the only time when the weight of the vehicle could be significantly changed. Alternatively the program can reduce the effect of road conditions by taking several or multiple weight readings over a short time interval and by applying an algorithm to these readings compensating for transient road conditions. A preferred form of electrical sensor 82 for determining the weight on an axle is shown in detail in FIGS. 7 to 9. This sensor 82 is a Hall, effect/magnetic sensor having a cylindrical ferrous case or housing 100 typically made of steel. The bottom end of this case is closed while the top end is open but enclosed preferably by an expandable boot 102, preferably made of rubber or synthetic rubber. The bottom end of the boot is firmly connected to the top end of the case 100 by any suitable means such as a pipe clamp 101 that can be tightened. The upper end of the boot is also firmly secured by any suitable means to a flat steel plate 105 that is rigidly connected to the frame 91 or 92. For example a steel ring 103 attached to the boot can be welded to the plate 105 to support the upper end of the boot. It will be understood that in this manner the open end of the sensor is completely enclosed during use of the vehicle and therefore dirt, dust and other foreign materials are kept out of the interior of the sensor. The bottom end of the case 100 is provided with two outwardly extending flanges 104 for connecting the bottom end of the case to the centre portion of the spring assembly. The flanges 104 can be connected by any suitable means to the spring assemblies, for example by short, small stud bolts fitted into holes in the upper leaves or by welding one or more of the flanges to one of the U-bolts 106 that hold the leaf springs together and that connect the leaf springs to the axle.

The sensor 82 has a non-ferrous extruded guide 108 fitted into the case 100 and extending the length thereof. This guide 108 has a longitudinally extending passage 110 therein, which passage has an hourglass shape in cross section. Snuggly received in the passage 110 is an elongate position transducer 112. In the embodiment shown the transducer 112 has a length approximately equal to that of the case 100 but it will be appreciated that it could be longer. It is biased upwardly by a coil spring 114, the upper end of which fits snuggly into a longitudinally extending hole 116 formed in the bottom end of the transducer. The bottom end of the spring rests against the bottom end of the casing and can be held against sideways movement by a small projection 118 formed on or connected to the bottom of the casing. The upper end of the transducer 112 engages a horizontally-extending plate or pad 120 rigidly connected to a larger plate 105 extending from the side of the frame 91 or 92. Preferably this pad is coated on the bottom with Teflon (trade mark) or some other suitable friction reducing material. Because of the Teflon, the friction between the pad 120 and the adjacent top end of the transducer is quite small and this results in vertical movement of the transducer that is very close to being truly vertical whatever forces may be acting on the spring and axle assemblies or the vehicle frame at the time. The use of the Teflon also permits the upper end of the transducer to move horizontally if required by forces acting on it. Mounted in the side of the transducer 112 is a permanent magnet 122. Mounted adjacent to the transducer and to this magnet is an elongate Hall sensor 124 mounted on an elongate printed circuit board 126. Affixed to the top of the printed circuit board are two terminals 128 for connecting the sensor to the microcomputer via a suitable cable. The construction and operation of Hall effect/magnetic sensors are well known and accordingly detailed description of this type of sensor is deemed unnecessary for purposes of the present invention. It is simply necessary to select a suitable known sensor capable of measuring the possible range of linear movement. Furthermore it will be appreciated that each of the sensors on the trucks can be calibrated, both initially and on subsequent occasions at an authorized inspection station capable of determining the actual weight of the truck and its load (for example the highway station 16 illustration in FIG. 1). Calibration is a relatively simple straightforward matter when the actual weight is known because then the reading from the sensors can be adjusted electronically in the microcomputer so that it corresponds to the actual total weight. Subsequent changes in weight are indicated with sufficient accuracy for present purposes by the sensors 82.

Preferably suitable known means are provided at each sensor 82 and similar sensors on the vehicle for adjusting the analog electrical signal or other electrical signal produced by the sensor to compensate for temperature changes. Such temperature compensating devices are well known and need not be further described herein. They can be in the form of an additional electrical circuit in chip form.

Figure 10:
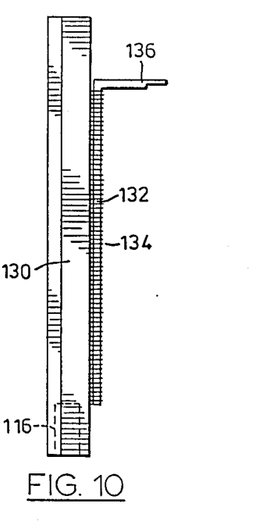
FIG. 10 is a side view illustrating a position transducer and an elongate printed circuit board with an electrical coil wrapped thereon, which two parts form the internal working components for an inductive load deflection sensor.

An alternative means for sensing the weight on a vehicle axle and spring assembly is illustrated in part in FIG. 10. This weight sensing means comprises an inductive load deflection sensor whose outer casing would be constructed in the same manner and supported in the same manner as the case 100 shown in FIGS. 7 and 8. The elongate transducer 130 is also shaped and constructed in a manner similar to the transducer 112 but it must be made of iron or steel, and it can engage a Teflon covered pad at the top end as already described. The transducer 130 is also fitted into a non-ferrous extruded guide essentially identical to the guide 108. The primary difference in this sensor is that it is provided with a thin, elongate printed circuit board 132 around which is wrapped an electrical coil 134 that extends substantially the length of the board 132. The coil 134 is energized with a signal so that vertical movement of the ferrous position transducer 130 produces an incremental inductive change in the oscillator formed by the coil 134. By connecting terminals 136 to the microcomputer and by suitable calibration of the sensor, the weight on the axle adjacent the sensor can be determined with sufficient accuracy. Calibration can be carried out in the same manner as the Hall effect/magnetic sensor 82. In other words initial and subsequent calibration of the unique tractor, trailer, and load combination can be done by an authorized inspection station such as one operated by a government authority. This station determines the actual load of the combination and this information is fed into the microcomputer which automatically carries out the necessary calibration (adjusting the existing readings from the sensors so that they correspond to the actual weight). If the weight on each axle must be provided by the sensors then each axle would be weighed separately at the station and the weight reading from each sensor adjusted as required.

Other types of sensors, both dynamic and static, can be used to determine the weight of a vehicle by the deflection between the suspended bottom or frame of the truck and a calibrated reference point on an axle and spring assembly. For example an optical system could be used if desired and such a system can take various forms. In one optical system, incremental counting by means of a scale is used. By counting the number of divisions on the scale up to a set location, the weight on the spring and axle assembly can be determined. Similar incremental counting scales are already in use on known weigh scales. Another optical system involves position indicating. This system employs a scale having holes therein. The scale is arranged beside a series of light sources. Depending upon the position of the scale, one of the light sources will be lined up with a hole in the scale and the device is able to provide a weight reading that corresponds to the source that has a hole lined up therewith. A third type of optical system depends upon light intensity. This measuring system is able to determine with considerable accuracy the intensity of a reflected beam of light, which intensity depends upon the distance that the reflected light has travelled from its source. Each of these optical systems can be calibrated in a manner similar to the above discussed Hall effect/magnetic sensors and inductive sensors, that is, initial and subsequent calibrations are carried out at an authorized inspection station capable of determining the actual weight of the vehicle and its load and entering this weight into the microcomputer. Again suitable means can be provided for adjusting the reading so that it takes into account the effect of temperature changes if desired.

With the use of the aforementioned weight sensors, the vehicle monitoring unit of the invention is able to advise either the user or owner of the vehicle or the authorities or both that the vehicle does or does not exceed the maximum weight limit for the vehicle. These monitoring units can also warn of a shift in the load or indicate uneven load distribution. The latter capability is particularly provided by the fact that in the preferred embodiment each axle is provided with two weight sensors (see FIG. 4), one at each end of the axle and spring assembly. Thus the sensors are capable, with proper programming of the microcomputer, of indicating when the weight on one end of the axle substantially exceeds the weight at the other end. Alternatively they can also indicate when the weight on the rear tandem axles of a transport truck greatly exceeds the weight on the front (tractor) axles. If weight readings are taken while the truck is moving and at short time intervals, the unit can also warn of sudden shift in the load. In some cases the weight distribution may be so uneven as to be illegal or contrary to government regulation.

Figure 17:
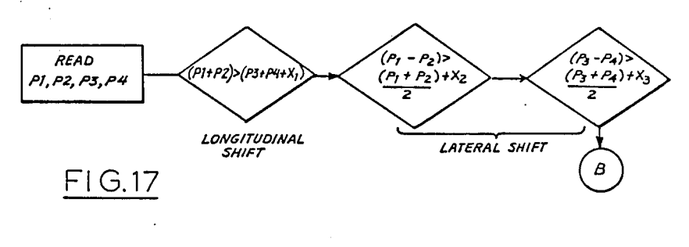
FIG. 17 is a block diagram illustrating logic that can optionally be part of the software.

With reference to FIGS. 4 and 17, a possible programme for determining whether or not there has been a significant shift in the load being carried by a truck will now be explained. For purposes of this programme, only the sensors 82 located below the load carrying section of the truck will be utilized. As shown in FIG. 4, these eight sensors are organized into four groups P1, P2, P3 and P4. The value of each of these groups can be determined by adding the weights measured by two adjacent sensors 82. The two sensors will be located one behind the other in a tandem axle situation such as that shown in FIG. 4. The total of the two sensors will indicate approximately the weight being carried in each corner of the transport trailer. In the programme of FIG. 17, the first step is a calculation to determine whether or not there has been a longitudinal shift in the load. To do this $P_1$ and $P_2$ are added together as are $P_3$ and $P_4$. A further programmed amount $X_1$ is added to the total of $P_3$ and $P_4$ and then the programae determines whether or not $P_1$ plus $P_2$ exceeds $P_3$ plus $P_4$ plus $X_1$. If the answer is yes then a signal would be generated by the microprocessor indicating that the longitudinal weight distribution is unsatisfactory and should be corrected. This information would be provided to the operator of the vehicle immediately by way of the display device 36 and would be provided to the transport authorities upon request for this type of information. The programme then proceeds to determine whether or not there has been a lateral shift. To do this the difference between $P_1$ and $P_2$ is compared to the sum of the average of $P_1$ plus $P_2$ added to a selected amount $X_2$. The same type of calculation is carried out for the rear of the transport truck using $P_3$ and $P_4$. In each case if the difference between $P_1$ and $P_2$ or $P_3$ and $P_4$ exceeds the average amount by the selected weight $X_2$ or $X_3$, a warning indicating a lateral shift will be generated by or indicated by the microprocessor.

Figure 11:
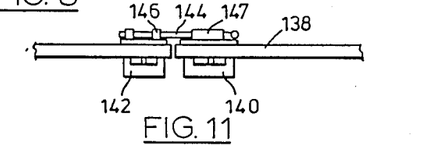
FIG. 11 is a schematic detail view, taken from the top, of two loading doors for a transport truck, which doors have been fitted with a Hall effect/magnetic sensor for determining whether the doors have been opened.
Figure 12:
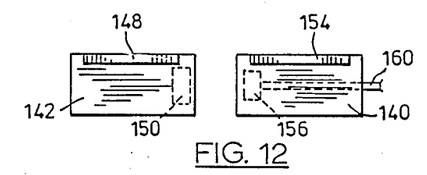
FIG. 12 is a top view of the Hall effect/magnetic sensor used in FIG. 11.
Figure 13:
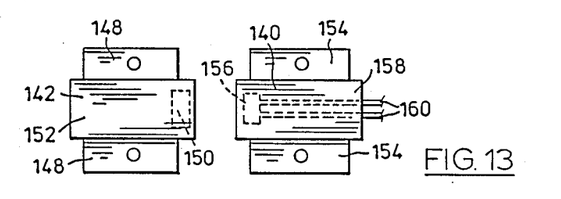
FIG. 13 is a front elevation of the Hall effect/magnetic sensor shown in FIG. 11.

Other types of sensors could and typically would be provided on a commercial vehicle with the present vehicle monitoring unit. For example FIGS. 11 to 13 illustrate a preferred means for sensing whether a loading door 138 in a transport vehicle has been opened and producing an electrical signal indicative thereof. Information as to whether or not a loading door has been opened can be vital, particularly in the case of bonded and sealed trailers. The door could be located either at the rear of the trailer or at the side and it could be a single or a double loading door. In the embodiment of FIGS. 11 to 13 the sensor comprises a Hall effect/magnetic sensor having a part 140 mounted on the loading door and another portion 142 mounted either on an adjacent door or a fixed side wall or end wall of the trailer. The parts of the sensor should be mounted on the inside of the load carrying compartment so that they cannot be tampered with or damaged, at least before one or both of the doors is opened. As shown the door or doors 138 are closed by a sliding bolt 144 located on the outside of the door or doors and connected to the doors by suitable brackets 146 and 147. It will be appreciated that the present invention will work equally as well if a lock or latch mechanism is used to secure the doors shut. The part 142 of the sensor has connecting tabs or flanges 148 which typically are connected to the inside of the door or transport trailer wall by bolts or screws (not shown). A permanent magnet 150 is mounted in a polycarbonate module 152. The other part 140 also has connecting tabs or flanges 154 by which this part can be connected to the inside of the door. A Hall sensor 156 is mounted at one end of a centre section 158 so that it is in close proximity to the magnet when the doors are properly closed. Two electrical wires extend from the Hall sensor to connecting terminals 160 which can be connected by suitable wiring 80 to the microcomputer. Again such Hall effect sensors are well known and accordingly a detailed description of the construction of and operation of the sensor illustrated by FIGS. 11 to 13 is deemed unnecessary. It will be understood that a significant movement of the magnet away from the Hall sensor 156 will generate an electrical signal that will be sent to the processing unit 46 and that will indicate that the door has been opened or is open. If desired such a signal and in particular a signal indicating that the door is in fact open, can trigger an audible alarm that can be heard by the operator of the vehicle. In this way he can take immediate steps to close the door if in fact it should be closed.

Figure 15:
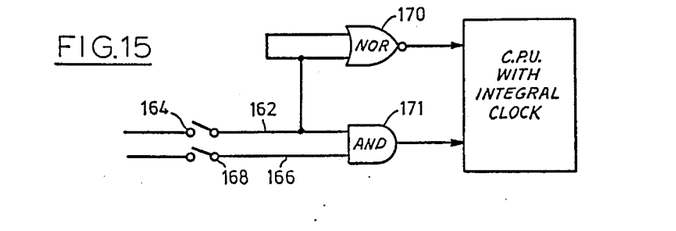
FIG. 15 is a schematic illustration of a logic circuit that can be used to feed information to the central processing unit concerning the operation of the vehicle.

Another optional feature that can be employed with the vehicle monitoring unit of the present invention is an integral clock in the microcomputer that is connected to NOR and AND gates in the manner indicated schematically in FIG. 15. A line or lead 162 connects one side of the AND gate to a first switch 164, which can be either the main engine ignition switch or a switch connected thereto and whose condition is dependent upon the state of the main engine ignition switch of a vehicle. If the main ignition switch is on than the switch 164 is closed (indicated by H in table I below). If the main ignition switch is off then the switch 164 is open or off (indicated by L in table I). The other side of the AND gate is connected by line 166 to a second switch 168, the condition of which depends upon whether or not the vehicle is stopped or parked. If the switch 168 is open or off, this is indicative of the fact that the vehicle is stopped. If the switch 168 is closed or on, it is indicative of the fact that the vehicle is moving or running.

The switch 168 can be a Hall switch located on the gear selector lever of the truck and operated by the selector lever. If the truck is an automatic, the switch is on if the lever is not in the park or neutral position. If the truck is a standard, the switch 168 is on if the lever is not in neutral. As shown in FIG. 15 the line 162 is connected to the input side of a NOR gate 170. By means of the two gates 170 and 171 and the first and second switches 164 and 168, the integral clock in the microcomputer is capable of recording stop, rest and run periods by electronically charting these periods in a well known manner. The timer logic for this system is indicated below in table I.

TABLE I

| IGNI-TION A | PARK B | OUTPUT TO C.P.U. NOR | AND | STATE (VEHICLE) | ACTION BY TIMER |
|---|---|---|---|---|---|
| L | L | H | L | REST | TIMER, NO |
| L | H | L | L | REST | PERIOD RECORDED |
| H | L | L | L | STOP | STOP PERIOD RECORDED |
| H | H | L | H | RUN | RUN PERIOD RECORDED |

NOTE:
L = OFF
H = ON

It will be appreciated that a chart of the stop and run periods for the truck could be of use to the owner of the vehicle in determining whether or not the vehicle has been operated or driven in the required manner. It could also be of use to the highway or transport authorities in determining whether or not a further check or inspection of the vehicle is required.

Another major component that can be built into the vehicle monitoring unit 22 is an analog/digital converter 174. As indicated in FIG. 14, this converter 174 is connected by suitable wiring to the various external sensors such as the weight sensors 82 and it is capable of converting the analog signals received from the sensors into digital signals or pulses that the processing unit 46 can utilize either by way of storing the information until it is required or by processing it immediately. A suitable converter for present purposes is that sold under model number ADC OB01 by Intersil Inc. of Cupertino, Calif. As the construction and operation of such converters is well known, further detailed description herein is unnecessary.

Figure 16:
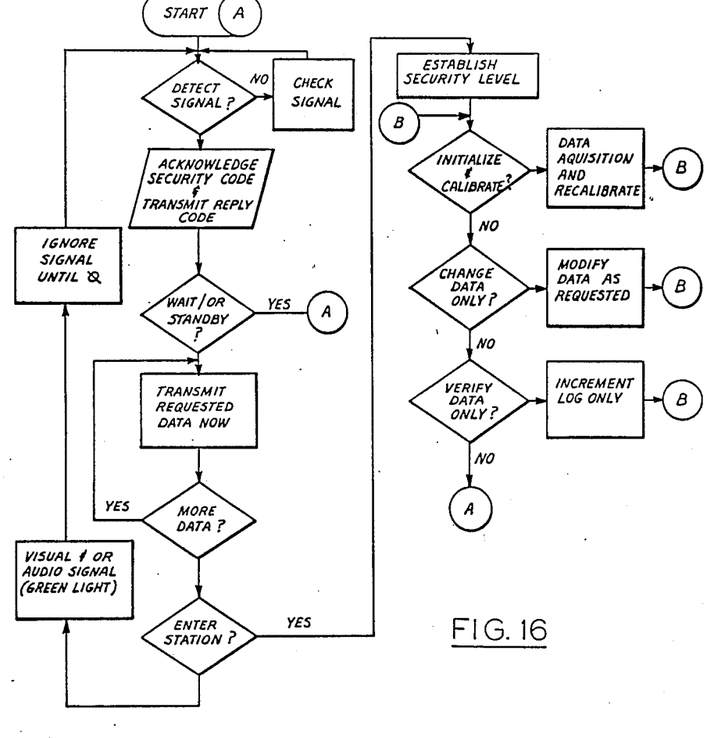
FIG. 16 is a block diagram illustrating the logic that is used for the software of the vehicle monitoring unit.

Reference will now be made to FIG. 16 which illustrates the logic which can be used to operate the receiver 42 and the transmitter 70. It will be appreciated that the illustrated logic sequence is carried out by the computer programme stored in the central processing unit 46. In the standard operating mode of the unit which is the mode at the start in the logic diagram, the receiver 42 and detector 44 are listening for the required FM signal, that is a signal from a vehicle monitoring station and having the required interrogation code. If the signal does not have the necessary code, no carrier detect signal is sent to the processing unit 46, the programme will not progress further, and the receiver will continue to listen for a proper interrogation signal. If the signal does carry the required code, a carrier detect signal is sent by the detector 44 and the computer programme will cause an acknowledgement signal to be sent to the monitoring station together with a reply code capable of identifying the vehicle to the station. After this information has been transmitted, the programme will go back to the receiver 42 which will be turned on and will wait for further instructions from the monitoring station. It will be appreciated that there can be a number of receivers on different vehicles awaiting instructions in this manner. Each unit will normally be dealt with in sequence, usually dependent on the order of receipt of an acknowledgement/reply by the monitoring station. In the absence of such instructions after a predetermined period of time, the programme will return to START A. If instructions are received and identified as such by the central processing unit (usually this is done by vehicle registration number), the programme will then progress to a transmit stage wherein either standard data concerning the vehicle or the specific data concerning the vehicle that has been requested by the message sent by the monitoring station is transmitted by the transmitter 70. After this data has been transmitted, the programme will again turn on the receiver and listen for further instructions sent by the monitoring station, which instructions would again be distinguishable by a vehicle identification number. If such a signal is received and further information is requested, the unit 46 will again send via the transmitter the necessary information. If no such signal is received after a predetermined period of time, the programme will proceed to the next stage. After the initial data has been sent or the subsequent data, the receiver may pick up a signal to enter the monitoring station so that the vehicle can be checked. Alternatively a signal may be sent by the monitoring station indicating that the vehicle is in a satisfactory condition and may proceed without stopping. If such a signal is received by the receiver 42, the central processing unit provides a signal to the driver or operator of the vehicle to advise him that he may proceed. As indicated already this signal may be conveyed to the operator by either a visual display or by an audio signal. Once the go ahead or green light signal has been received, the programme will proceed to the next stage wherein the signals being sent by the monitoring station are ignored by the unit until the signal reaches an effective zero level, that is it fades out. Once this has occurred the programme will return to the START A condition.

FIG. 16 also illustrates what will occur if the vehicle is instructed by the monitoring station to enter the station for an inspection. The vehicle will be inspected manually by an inspector and/or it will be weighed on a weigh-scales at the station. Once the inspection has been completed, the monitoring station personnel can alter the data stored in the vehicle unit or can recalibrate the vehicles sensors if these steps are deemed necessary. The entering of new information and the recalibration of the sensors can be done by way of radio transmission after the necessary security level code has been transmitted to the receiver 42. In one version of the system, each monitoring station would have a primary security code that would be transmitted first. After this code was acknowledged, a secondary security code could be transmitted and this code would provide the necessary high level clearance to proceed. Once the monitoring station or the official has gained the necessary access to the unit, the station or the official can do one of three possible operations or all three possible operations if desired. Firstly new data can be entered into the unit for future possible retrieval and the sensors can be calibrated or recalibrated. Secondly existing data in the unit can be changed to reflect the present situation. Thirdly the station official can simply verify the information stored in the unit. Once the necessary operation has been carried out, the programme in the unit returns the unit to the initial START A.

As indicated, it is desirable to have access to the vehicle monitoring unit limited by means of security level codes. Such a feature can be implemented in the unit of the described type by means of the computer programme used therein in a well known manner. In order to attain a certain level of access to the unit, it is necessary for the operator, the monitoring station, or the official to provide a certain password or passnumber. In one embodiment of the invention, there would be one password required by the programme to simply interrogate the unit, that is, to obtain necessary information therefrom either by way of radio transmission or by means of a visual display. There is another password required if the user wants to alter vital information stored in the system or to recalibrate the vehicle's sensors. The latter password would normally only be available to government officials and employees responsible for the monitoring of commercial vehicle traffic. There can even be a third security level (or a higher level if desired). A password for this highest level might be required in order to alter the cipher which is used to transmit information to and from the vehicle monitoring unit. The cipher can be altered if it is provided by a cipher chip that is electrically reprogrammable.

It will be understood that the lowest level password would be known by the owner or operator of the vehicle so that he can have access to the information stored in the unit. This low level password may also permit him to alter certain non-vital information stored in the unit, that is, information that is not important to government officials or others.

With respect to the ciphering of information sent by the transmitter 70 of the vehicle, one of two possible ciphering systems can be used depending upon the amount of security that is felt to be necessary. Firstly all vehicles using the highway system can employ the same cipher. With this system the transmission sent from each truck is ciphered in the same manner and therefore the information can be picked up simply and easily by a monitoring station employing the required single decipher unit or chip. This system has the advantage of being less expensive and is simple to set up. Alternatively if greater security is required, each truck on the highway could be provided with a different ciphering code, one that has been specifically assigned to the truck by the authorities. Because the authorities would have information concerning the code that has been assigned to specific trucks at its monitoring stations, after an identifying code such as a vehicle serial number has been transmitted to a monitoring station, its receiver can be set up automatically (by computer) to decipher the code being used by that specific vehicle. In this way there is no possiblity of unauthorized persons, such as the operators of other vehicles in the area, gaining access to the vital information being sent concerning the vehicle.

Although the present invention has been discussed and described primarily in the context of its usefulness to highway transport authorities, it will be appreciated that the described system could also be helpful to customs officials, particularly with respect to the monitoring of bonded cargos. Customs officers will be able to check quickly to determine if there has been any tampering with a bonded cargo if they are equipped with the same type of equipment as described above for use by transport officials.

It will be clear to those skilled in this art that various modifications and changes could be made to the described vehicle monitoring units and systems without departing from the spirit and scope of this invention. Accordingly all such modifications and changes as fall within the scope of the appended claims are intended to form part of this invention.

We therefore claim:

1. A vehicle monitoring system comprising: a vehicle monitoring station having a radio transmitter, a radio receiver, means for identifying a vehicle from a reply code transmitted to said receiver from said vehicle, means for requesting via said transmitter the transmission of stored data concerning said vehicle from said vehicle after receipt of said reply code and means for sending instructions to a driver of said vehicle via said franssmitter that said vehicle is either to stop at said station or not to stop and proceed past said station;

means for receiving a radio transmission from said transmitter located in the general vicinity of the vehicle at said vehicle monitoring station, said receiving means being adapted for installation in a vehicle and including carrier detect signal means for indicating the transmission of an interrogation signal from said transmitter and a phase detector for processing the the received radio transmission;

a central processing unit connected to said receiving means, adapted to receive and process information sent from said receiving means, capable of storing information received or produced by said unit, and producing said reply code upon receipt of said interrogation signal;

means for displaying or indicating to said driver information or instructions stored in or received by said central processing unit, including said instructions that said vehicle is either to stop or not stop and proceed;

means for sensing or measuring physical parameters of said vehicle, including the weight thereof, and converting the sensed or measured parameters to electrical signals indicative thereof;

means for conveying said electrical signals to said processing unit for storage or processing;

means for transmitting said reply code and subsequently said stored information concerning said vehicle by radio transmission from said processing unit to said vehicle monitoring station in the vicinity of said vehicle, said central processing unit permitting said transmission of the reply code only after receipt of said interrogation signal and permitting said subsequent transmission of said stored information only after receipt of a request for the transmission of same from said monitoring station; and power supply means for said monitoring system.

2. A vehicle monitoring system according to claim 1 wherein said sensing or measuring means comprise Hall effect/magnetic sensors mounted on axle and spring assemblies of said vehicle and adapted to measure relative movement between the undercarriage or body of the vehicle and said axle and spring assemblies and to produce an electrical signal that is indicative of the weight of said vehicle.

3. A vehicle monitoring system according to claim 2 wherein each Hall effect/magnetic sensor comprises a vertically arranged, elongate ferrous case adapted for rigid mounting on an axle and spring assembly, an elongate position transducer slidably mounted in said case, means for guiding vertical movement of said transducer in said case, an elongate Hall sensing device rigidly mounted in said case adjacent said transducer, and means for engaging the upper end of said transducer with said undercarriage or body of said vehicle.

4. A vehicle monitoring system according to claim 3 including a Teflon covered pad adapted to be mounted on said undercarriage or body of said vehicle adjacent the upper end of said transducer and wherein said engaging means include spring means for biasing said transducer upwardly into engagement with said Teflon covered pad.

5. A vehicle monitoring system according to claim 1 wherein said sensing or measuring means comprise inductive load deflection sensors mounted on axle and spring assemblies of said vehicle and adapted to measure relative movement between the undercarriage or body of the vehicle and said axle and spring assemblies and to produce an electrical signal that is indicative of the weight of said vehicle.

6. A vehicle monitoring system according to claim 5 wherein each inductive load deflection sensor comprises a vertically arranged, elongate ferrous case adapted for rigid mounting on an axle and spring assembly, an elongate ferrous position transducer slidably mounted in said case, means for guiding vertical movement of said transducer in said case, a thin elongate printed circuit board having an electrical coil wrapped thereon and rigidly mounted in said case adjacent said transducer, and means for engaging the upper end of said transducer with said undercarriage or body of said vehicle.

7. A vehicle monitoring system according to claim 1 wherein said receiving means includes a demodulator for converting a received frequency- or phase-shifted keyed encoded carrier signal into serial data usable by said central processing unit.

8. A vehicle monitoring system according to claim 7 wherein said means for sensing or measuring physical parameters and converting them into electrical signals includes an analogue to digital converter whose output is connected to said central processing unit.

9. A vehicle monitoring system according to claim 1 including keyboard means connectible to said central processing unit whereby the operator or owner of the vehicle can enter information into or provide instructions to said central processing unit.

10. A vehicle monitoring system according to claim 1 wherein said transmitting means includes a modulator, a band limit filter, and a linear amplifier to monitor and maintain a required data signal level for said transmitting means.

11. A vehicle condition monitoring system for installation in a vehicle comprising:
means for receiving a radio transmission from a remote transmitter located in the vicinity of the vehicle;
a central processing unit operatively connected to said receiving means and adapted for mounting in said vehicle and for processing and storing information sent to the processing unit by said receiving means;
power supply means for said monitoring system;
means for sensing or measuring physical parameters of said vehicle and converting the sensed or measured parameters to electrical signals indicative thereof, said sensing or measuring means including means for measuring the weight of the vehicle while said vehicle is moving;
means for conveying said electrical signals to said processing unit for storage or processing;
said processing unit being capable of receiving and storing a number of weight readings over a short term interval and applying an algorithm to said weight readings in order to determine the weight of the vehicle while said vehicle is moving;
means for transmitting information concerning said vehicle, including the determined weight thereof at the time of the transmission, by radio wave transmission from said processing unit to a remote vehicle monitoring station in the general vicinity of said vehicle; and,
means for alerting an operator of said vehicle that he should stop the vehicle at said vehicle monitoring station, said alerting means operating in response to a radio transmission from said vehicle monitoring station received by said receiving means.

12. A vehicle condition monitoring system according to claim 11 wherein said alerting means comprises means for producing an audio sound that can be heard by said operator.

13. A vehicle condition monitoring system according to claim 11 including keyboard means connectible to said central processing unit whereby the operator or owner of the vehicle can enter information into or provide instructions to said central processing unit.

14. A vehicle condition monitoring system comprising:
means for sensing or measuring physical parameters of a vehicle including the weight thereof and converting the sensed or measured parameters to electrical signals indicative thereof, said sensing or measuring means being adapted for mounting on said vehicle and adapted for sensing or measuring the weight of the vehicle while said vehicle is moving;
a central processing unit adapted to receive, process and store information received from said sensing or measuring means and adapted to be mounted in said vehicle, said processing unit being capable of receiving and storing a number of weight readings over a short time interval and applying an algorithm to said weight readings in order to determine the weight of the vehicle while said vehicle is moving;
means for conveying said electrical signals to said processing unit from said sensing or measuring means;
means for visually displaying information stored in or received by said central processing unit to an operator of said vehicle;
means for receiving a radio transmission from a remote transmitter located in the vicinity of the vehicle, said receiving means being operatively connected to said central processing unit;
means for transmitting information concerning said vehicle, including the determined weight thereof at the time of the transmission, by radio transmission from said processing unit to a remote vehicle monitoring station in the general vicinity of said vehicle; and
power supply means for said monitoring system.

15. A vehicle condition monitoring system according to claim 14 wherein said receiving means includes a carrier detect signal means for indicating the transmission from said remote transmitter of an interrogation signal and a phase detector for processing the received radio transmission and wherein said central processing unit permits said transmission of information only after receipt of said interrogation signal.

16. A vehicle condition monitoring system comprising:

- means for sensing or measuring physical parameters of a vehicle including the weight thereof and converting the sensed or measured parameters to electrical signals indicative thereof, said sensing or measuring means being adapted for mounting on said vehicle;
- means for detecting wehther or not said vehicle is moving or stopped and producing an electrical signal indicative thereof;
- a central processing unit adapted to receive, process and store information from said sensing or measuring means and from said detecting means, said unit being mountable in said vehicle, said unit including means for storing information on the measured weight of the vehicle when it was last stopped;
- means for conveying all of the aforementioned electrical signals to said processing unit;
- means for visually displaying information stored in or received by said central processing unit to an operator of said vehicle;
- means for receiving a radio transmission from a remote transmitter located in the vicinity of the vehicle, said receiving means being operatively connected to said central processing unit;
- means for transmitting information concerning said vehicle, including the weight thereof when the vehicle was last stopped, by radio transmission from said processing unit to a remote monitoring station in the general vicinity of said vehicle; and
- power supply means for said monitoring system.

17. A vehicle condition monitoring system according to claim 16 wherein said receiving means has carrier detect signal means for indicating the transmission of an interrogation signal from said remote transmitter and a phase detector for processing the received radio transmission;

and wherein said central processing unit permits said transmission of information only after receipt of said carrier detect signal.

* * * * *